(12) United States Patent
Hirata

(10) Patent No.: US 7,118,462 B2
(45) Date of Patent: Oct. 10, 2006

(54) DISK FOR TOROIDAL CONTINUOUSLY VARIABLE TRANSMISSION AND METHOD OF MACHINING THE SAME

(75) Inventor: Kiyotaka Hirata, Kanagawa (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 11/091,550

(22) Filed: Mar. 29, 2005

(65) Prior Publication Data

US 2005/0215184 A1 Sep. 29, 2005

(30) Foreign Application Priority Data

Mar. 29, 2004 (JP) ............... P.2004-094890

(51) Int. Cl.
*B24B 1/00* (2006.01)
*B24B 7/19* (2006.01)
*B24B 7/30* (2006.01)

(52) U.S. Cl. .................. 451/63; 451/51; 451/406; 451/407; 451/408

(58) Field of Classification Search .............. 451/51, 451/63, 406, 407, 408; 476/40
See application file for complete search history.

(56) References Cited

U.S. PATENT DOCUMENTS

| | | | |
|---|---|---|---|
| 4,872,371 A | 10/1989 | Fellows | |
| 6,074,324 A | 6/2000 | Ishikawa et al. | |
| 6,347,980 B1 * | 2/2002 | Kamamura et al. | ........... 451/47 |
| 6,572,452 B1 * | 6/2003 | Hatase et al. | ............... 451/51 |
| 6,663,471 B1 | 12/2003 | Kamamura et al. | |

FOREIGN PATENT DOCUMENTS

| | | |
|---|---|---|
| JP | 8-159229 A | 6/1996 |
| JP | 11-63139 A | 3/1999 |
| JP | 11-148543 A | 6/1999 |
| JP | 2000-24899 A | 1/2000 |
| JP | 2000-271844 A | 10/2000 |
| JP | 2002-28818 A | 1/2002 |
| JP | 2002-192450 A | 7/2002 |
| JP | 2003-301908 A | 10/2003 |
| JP | 2004-34229 A | 2/2004 |

* cited by examiner

*Primary Examiner*—Lee D. Wilson
*Assistant Examiner*—Shantese McDonald
(74) *Attorney, Agent, or Firm*—Sughrue Mion, PLLC

(57) ABSTRACT

A method of machining a disk for a toroidal-type continuously variable transmission, has the steps of fixing a disk to a core bar having a pair of reference portions for rotation at both end thereof, clamping the reference portions by a first center and a second center opposing the first center, abutting a first flat surface portion formed on one side surface of the disk against a reference for axial abutment, machining a first traction surface formed on another side surface of the disk, inverting the disk with the disk fixed to the core bar, clamping the pair of reference portions by the first center and the second center, abutting a second flat surface portion formed on the other side surface of the disk against the reference for axial abutment and machining a second traction surface formed on the one side surface of the disk.

11 Claims, 12 Drawing Sheets

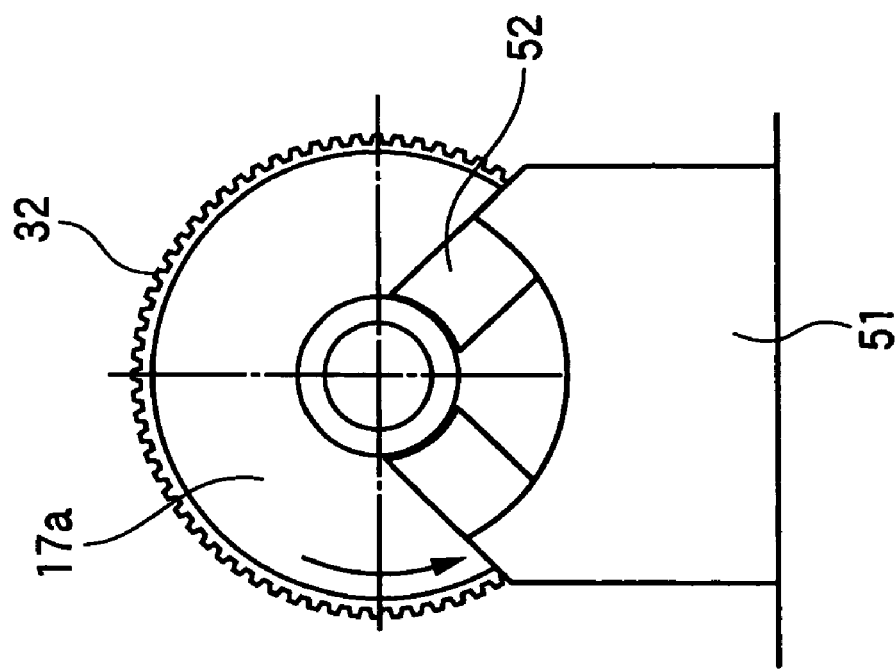
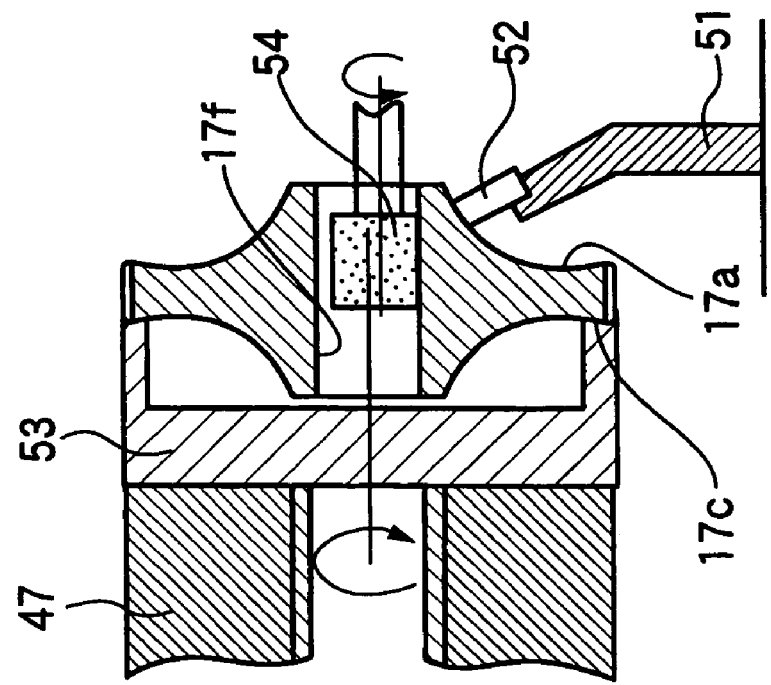

DISK FOR TOROIDAL CONTINUOUSLY VARIABLE TRANSMISSION AND METHOD OF MACHINING THE SAME

The present invention claims foreign priority to Japanese patent application no. P.2004-094890, filed on Mar. 29, 2004, the contents of which is incorporated herein by reference.

BACKGROUND OF THE INVENTION

1. Field of the Invention

The present invention relates to disk for a toroidal continuously variable transmission which is used as a transmission mainly for an automobile or for various industrial machinery, as well as a method of machining the same.

2. Description of the Related Art

In recent years, as variable transmissions for use in automobiles or the like, toroidal continuously variable transmissions are used. In addition, to cope with a greater input torque, double cavity-type toroidal-type continuously variable transmissions are used in which two sets of continuously variable transmission mechanisms are provided.

Conventionally, with this type of toroidal-type continuously variable transmission, both output disks of the two sets of continuously variable transmission mechanisms are disposed in close proximity to a periphery of an input shaft, and the rotation of the input disk is transmitted to the output disks by means of power rollers. In addition, an output gear is coupled between the both output disks, and mutually synchronized rotations of the both disks are transmitted to the output gear.

Meanwhile, a technique is known in which to make the above-described toroidal-type continuously variable transmission in order to be lightweight, an output gear for transmitting a driving force on an outer periphery of the output disk to fetch the power from the output disk (e.g., refer to Japanese Patent Unexamined Publication JP-A-8-159229). In addition, there is a type in which a pair of output disks are formed of the same material and are constructed as an integral-type output disk, and the length of the toroidal-type continuously variable transmission is made compact. It is known that a surface having concave and convex portions, which is constituted by an output gear for transmitting the driving force and sensor grooves or the like for detecting the state of rotation, is also provided on the outer periphery of such an integral-type output disk (e.g., refer to U.S. Pat. No. 4,872,371 and JP-A-11-63139). The output disk disclosed in U.S. Pat. No. 4,872,371 has traction surfaces on its both surfaces, and has an output gear formed integrally on its outer periphery for transmitting the driving force. Meanwhile, in the case of the output disk disclosed in JP-A-11-63139, an integral-type output disk 103 having traction surfaces 101 and 102 on its both surfaces and an output gear 104 are machined separately, and are subsequently integrated by welding or the like, as shown in FIG. 11.

In addition, since the disk having the traction surfaces has a function of transmitting the driving force while rotating at high speed, if the disk runs out when rotating, drawbacks can occur in that the state of speed change becomes unstable and the disk fails to synchronize. For this reason, it is known that the amount of runout of the traction surface is set to 0.02 mm or less (e.g., refer to JP-A-11-148543). Accordingly, also with the integral-type output disk having traction surfaces on its both surfaces, there is a need to increase the accuracy in the concentricity of the traction surfaces on the both surfaces and the accuracy in the concentricity of each traction surface with respect to portions where the disk is rotatively supported (mainly the inner peripheral surface).

Furthermore, various methods have been proposed as methods of machining a disk for a toroidal-type continuously variable transmission (e.g., refer to JP-A-2002-28818, U.S. Pat. No. 6,663,471, JP-A-2000-271844, JP-A-2000-24899 and JP-A-2002-192450). In the machining method disclosed in JP-A-2002-28818, the traction surface is machined by using as a machining reference spline tooth surfaces at the inner peripheral surface of the disk. In addition, in the machining method disclosed in U.S. Pat. No. 6,663,471, as shown in FIG. 12, there are provided a chuck mechanism 205 for holding a CVT disk 204 which has an inner surface involute spline portion 201, an outer peripheral surface 202, and a traction surface 203 having a predetermined machining allowance, as well as a grinding mechanism 207 equipped with a grinding wheel 206 for grinding the CVT disk 204. Grinding is performed by tilting either one of the CVT disk 204 and the grinding wheel 206 with respect to the other. At this juncture, chucking a part of the inner surface involute spline portion 201 by the chuck mechanism 205, and the traction surface 203 is ground, and at the same time an inner surface portion 208 is concurrently ground in combination by an inner surface grinding wheel 210 fitted to an inner surface grinding spindle 209. Therefore, high accuracy in concentricity is ensured between the traction surface 203 and the inner surface portion 208.

In addition, with the integral-type output disk, to maintain the accuracy in the concentricity of both traction surfaces and the accuracy in the concentricity of each traction surface and the inner peripheral surface to high levels, a machining method such as the one shown in FIGS. 13 and 14 is known.

First, as shown in FIG. 13, one flat surface portion 302a of an integral-type output disk 301 is abutted against a reference washer 303, and an electromagnetic force is applied to the reference washer 303 to fix the disk 301. In addition, an outer peripheral surface 304 of the disk 301 is abutted against a pair of shoes 306 fixed to a supporting base 305, so as to position the disk 301 in the radial direction. Then, the outer peripheral surface 304 of the disk 301 rotates integrally with the reference washer 303 while sliding on the shoes 306, and its inner peripheral surface 308 is ground by an inner periphery grinding wheel 307 which is rotating.

Next, as shown in FIG. 14, in the state in which the disk 301 is being supported in the same way as in FIG. 13, one traction surface 310a is machined by a traction surface grinding wheel 309. In addition, after the one traction surface 310a has been machined, the disk 301 is inverted, and the other flat surface portion 302b is abutted against the reference washer 303 to fix the disk 301, and the other traction surface 310b is machined by the traction surface grinding wheel 309.

Accordingly, the grinding work of the both traction surfaces 310a and 310b and the inner peripheral surface 308 is performed while the outer peripheral surface 304 is abutted against the shoes 306 to effect radial positioning and while the disk 301 is being rotatively driven by the reference washer 303 abutting against the flat surface portions 302a and 302b. Here, since the disk 301 rotates while sliding without being moved away from the shoes 306, the center of rotation of the disk 301 is the outer peripheral surface. As a result, all the machined surfaces are theoretically machined concentrically with the outer peripheral surface, and the both traction surfaces 310a and 310b and the inner peripheral surface 308 can be theoretically machined concentrically with each other.

In a case where the integral-type output disk is machined by using the machining method disclosed in U.S. Pat. No. 6,663,471, the accuracy in the concentricity between one traction surface and the inner peripheral surface can be made high. However, to machine the other traction surface, it is necessary to remove the disk from the chuck mechanism once. For this reason, due to an error at the time of chucking or the biting of a foreign material or the like, there is a possibility that the chucking accuracy becomes unstable, resulting in the deterioration of the accuracy in concentricity with the one traction surface which has already been machined.

In addition, with the method of machining an integral-type disk shown in FIGS. 13 and 14, it is prerequisite that all or a portion of the outer peripheral surface of the disk be a smooth cylindrical surface. If an surface having concave and convex portions 311 constituted by a gear or sensor grooves or the like is present on the outer peripheral surface 304, as shown in FIG. 15, vibrations can occur on the supporting base 305, possibly rendering the machining impossible.

Furthermore, in a case where the integral-type disk having an surface having concave and convex portions on its outer peripheral surface is machined, after the outer peripheral surface is formed into a smooth cylindrical surface and machining is effected with high accuracy in concentricity by the machining method shown in FIGS. 13 and 14, it is conceivable to integrate a separate gear or the like by welding and press fitting, as disclosed in JP-A-11-63139. However, since the number of parts increases, the number of steps increases due to the step for integration, so that there is a problem in that the machining cost increases.

SUMMARY OF THE INVENTION

The present invention has been devised in view of the above-described problems, and its object is to provide a toroidal-type continuously variable transmission which makes it possible to improve the transmission performance by machining the integral-type disk having traction surfaces on its both surfaces such that the accuracy in concentricity between the traction surfaces and the accuracy in the concentricity of each traction surface and the inner peripheral surface become high irrespective of the shape of the outer peripheral surface.

According to a first aspect of the present invention, there is provide a method of machining a disk for a toroidal-type continuously variable transmission, the disk including:
a first side surface having a first traction surface and a second flat surface portion; and
a second side surface having a second traction surface and a first flat surface portion,
the method of machining the disk comprising the steps of:
fixing an annular disk to a core bar having a pair of reference portions for rotation at both end thereof;
clamping the pair of reference portions by a first center on a main spindle side of a finishing machine and a second center opposing the first center;
abutting a first flat surface portion against a reference for axial abutment attached to the main spindle;
machining a first traction surface by rotatively driving the disk;
inverting the disk with the disk fixed to the core bar;
clamping the pair of reference portions by the first center and the second center;
abutting a second flat surface portion against the reference for axial abutment; and
machining a second traction surface by rotatively driving the disk.

According to a second aspect of the present invention, there is provided a method of machining a disk for a toroidal-type continuously variable transmission, comprising the steps of:
abutting a traction surface formed on one side surface of an annular disk against a supporting member fixed to a supporting base so as to defined a position of the disk in a radial direction by the supporting base;
abutting a flat surface portion formed on another side surface of the disk against a reference for axial abutment which is fixed to a main spindle of a finishing machine and is rotatively driven so as to defined a position of the disk in an axial direction by the reference for axial abutment; and
machining an inner peripheral surface of the disk in a state in which the position of disk is defined in the radial direction and the axial direction.

According to a third aspect of the present invention as set forth in the first aspect of the present invention, it is preferable that a convex and a concave portion are formed on an outer peripheral surface of the disk.

According to a fourth aspect of the present invention as set forth in the second aspect of the present invention, it is preferable that a convex and a concave portion are formed on an outer peripheral surface of the disk.

According to a fifth aspect of the present invention, there is provided a disk for a toroidal-type continuously variable transmission, comprising:
a first and a second traction surface respectively provided on both side surfaces of the disk;
a first and a second flat surface portion respectively provided on both radially outward side surfaces of the first and the second traction surfaces; and
an inner peripheral surface provided in a center of the disk,
wherein the first and the second traction surfaces are machined with the inner peripheral surface of the disk fixed to a core bar and by using the core bar as a reference for rotation during machining.

According to a sixth aspect of the present invention, there is provided a disk for a toroidal-type continuously variable transmission, comprising:
a first and a second traction surface respectively provided on both side surfaces of the disk;
a first and a second flat surface portion respectively provided on both radially outward side surfaces of the first and the second traction surfaces; and
an inner peripheral surface provided in a center of the disk,
wherein the inner peripheral surface is machined by defining a position of the traction surface in a radial direction and by using the traction surface as a reference for rotation.

According to a seventh aspect of the present invention as set forth in the fifth aspect of the present invention, it is preferable that a convex and a concave portion are formed on an outer peripheral surface of the disk.

According to an eighth aspect of the present invention as set forth in the sixth aspect of the present invention, it is preferable that a convex and a concave portion are formed on an outer peripheral surface of the disk.

According to a ninth aspect of the present invention as set forth in the first aspect of the present invention, it is preferable that a collet chuck is used as the core bar.

According to a tenth aspect of the present invention as set forth in the first aspect of the present invention, it is preferable that the reference portion for rotation is a center hole.

According to an eleventh aspect of the present invention as set forth in the first aspect of the present invention, it is preferable that the reference portion for rotation is a male center.

According to a twelfth aspect of the present invention as set forth in the first aspect of the present invention, it is preferable that a backing plate is used as the reference for axial abutment.

According to a thirteenth aspect of the present invention as set forth in the first aspect of the present invention, it is preferable that the abutment between the first flat surface portion and the reference for axial abutment is kept by electromagnetic force.

According to a fourteenth aspect of the present invention as set forth in the first aspect of the present invention, it is preferable that the disk is integrally formed.

According to a fifteenth aspect of the present invention as set forth in the first aspect of the present invention, it is preferable that the method of machining the disk for a toroidal-type continuously variable transmission further comprising the steps of:

abutting the first traction surface against a supporting member fixed to a supporting base so as to defined a position of the disk in a radial direction by the supporting base;

abutting the first flat surface portion against the reference for axial abutment so as to defined a position of the disk in an axial direction by the reference for axial abutment; and machining an inner peripheral surface of the disk in a state in which the position of disk is defined in the radial direction and the axial direction.

According to the method of machining a disk for a toroidal-type continuously variable transmission according to the present invention, since the inner peripheral surface of the output disk is adapted to be fixed to the core bar, the both traction surfaces can be machined with the shape of the outer peripheral surface kept arbitrary. In addition, since the both traction surfaces are machined by using the core bar as a reference for rotation during machining without needing to unchuck in the course of the operation, the accuracy in the concentricity of the both traction surfaces becomes high.

In addition, according to the method of machining a disk for a toroidal-type continuously variable transmission in accordance with the present invention, the traction surface is positioned in the radial direction on the fixed supporting base, and the output disk is rotated while the traction surface is being slid on the supporting base. Thus, the machining of the inner peripheral surface is effected while using the traction surface as the reference for rotation. Therefore, the accuracy in the concentricity of the traction surface and the inner peripheral surface becomes high. Furthermore, no restriction is imposed on the shape of the outer peripheral surfaces in machining.

According to the method of machining a disk for a toroidal-type continuously variable transmission in accordance with the present invention, it is possible to improve the transmission performance of the toroidal-type continuously variable transmission by machining the integral-type disk having traction surfaces on its both surfaces such that the accuracy in the concentricity of each traction surface and the inner peripheral surface becomes high irrespective of the shape of the outer peripheral surface.

BRIEF DESCRIPTION OF THE DRAWINGS

FIGS. 2A and 2B are diagrams illustrating an output disk of the toroidal-type continuously variable transmission, in which FIG. 2A is a cross-sectional view thereof and FIG. 2B is a side elevational view thereof;

FIGS. 8A and 8B are schematic cross-sectional views illustrating a step of machining an inner peripheral surface of the output disk shown in FIGS. 2A and 2B;

DETAILED DESCRIPTION OF THE PREFERRED EMBODIMENTS

Figure 1:
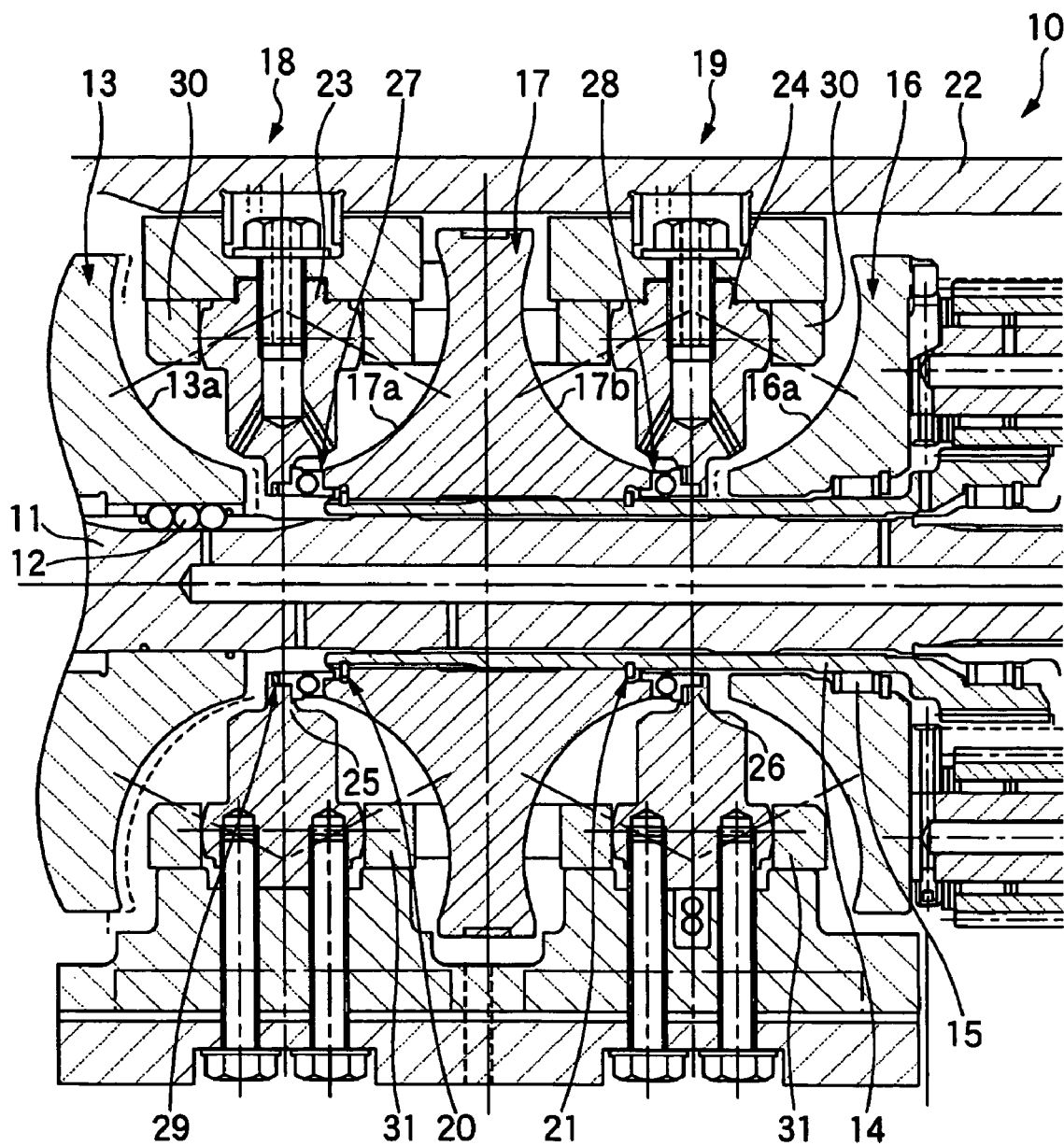
FIG. 1 is a cross-sectional view illustrating a double cavity-type toroidal continuously variable transmission in accordance with an embodiment of the present invention.

Referring to the drawings, a detailed description will be given of a disk for a toroidal-type continuously variable transmission and a method of machining the same in accordance with an embodiment of the present invention.

Figure 2B:
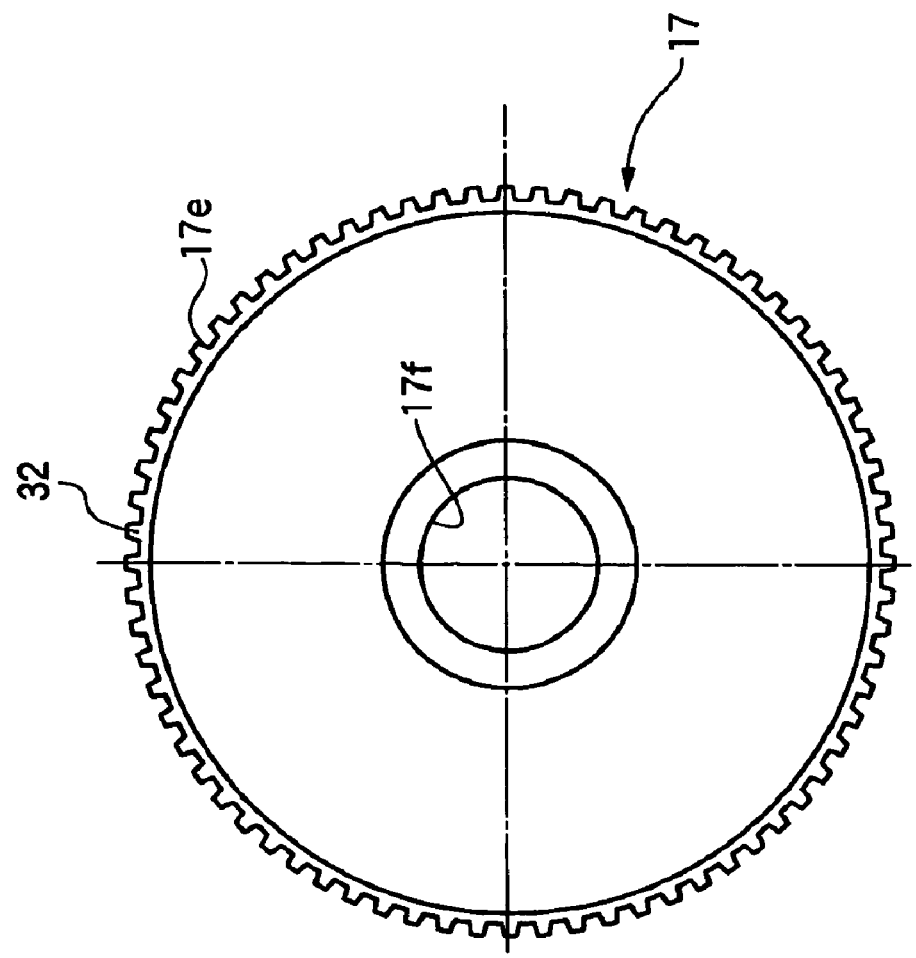
Figure 2A:
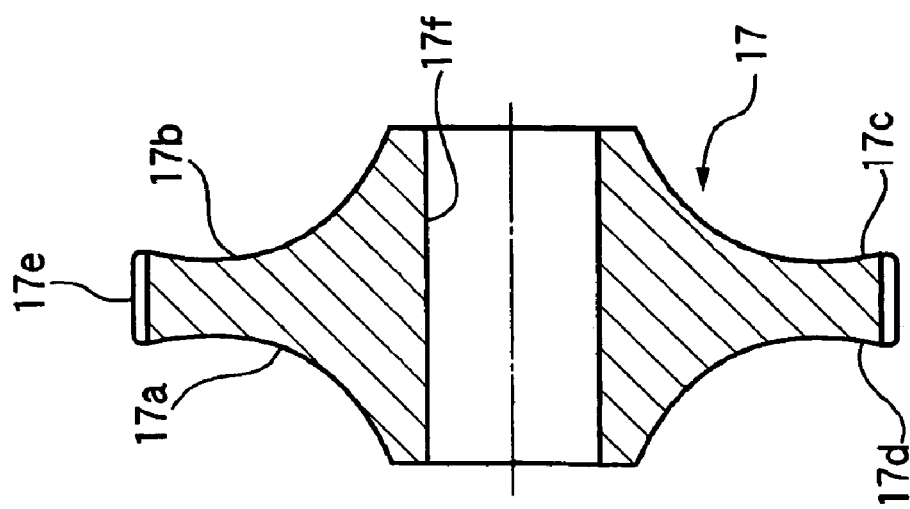

FIG. 1 is a cross-sectional view of essential portions illustrating a double cavity toroidal continuously variable transmission in accordance with a first embodiment of the present invention, and FIGS. 2A and 2B are diagram illustrating an output disk of the toroidal-type continuously variable transmission. In addition, FIGS. 3 to 8 are diagram illustrating a step of machining an integral-type output disk shown in FIGS. 2A and 2B.

Referring to FIG. 1, in a double cavity toroidal continuously variable transmission 10, a first input disk 13 which is supported by means of a ball spline 12 is provided around an input shaft 11, and a second input disk 16 which is supported by means of a needle roller bearing 15 is provided around a sleeve 14 which is fitted over the input shaft 11. The first and second input disks 13 and 16 are supported so as to be axially displaceable with respect to the input shaft 11, and rotate together with the input shaft 11.

In addition, an integral-type output disk 17 is provided around the sleeve 14 between the first and second input disks 13 and 16 in an axial direction, and the output disk 17 rotates together with the sleeve 14. As for the first and second input disks 13 and 16 and the integral-type output disk 17, their mutually opposing inner surfaces respectively have circular arc-shaped concave cross sections (traction surfaces) 13a, 16a, 17a, and 17b. A first cavity 18 is formed between the first input disk 13 and the integral-type output disk 17, and a second cavity 19 is formed between the second input disk 16 and the integral-type output disk 17.

In addition, in the integral-type output disk 17, its axial movement is restricted by stop rings 20 and 21 provided on its both end portions, and the thrust load applied to the integral-type output disk 17 is supported by thrust ball bearings 27 and 28 each provided between the respective opposite end portion of the output disk 17 and each of holding cylindrical portions 25 and 26 of supports 23 and 24 fixed to a casing 22. It should be noted that the thrust ball bearing 27 in the first cavity 18 is retained by the holding cylindrical portion 25 of the support 23 by means of a corrugated spring 29.

Although not shown, a pair of power rollers having spherical convex surfaces for abutting against inner side surfaces of the respective disks are respectively interposed in the first cavity 18 and in the second cavity 19. These power rollers are respectively supported rotatably around displacement shafts, and are disposed on inner side surface sides of trunnions by means of power roller bearings. As pivot shafts provided on both end portions of the respective trunnions are supported by an upper yoke 30 and a lower yoke 31, the trunnions are supported so as to be swingable with respect to these yokes 30 and 31 and displaceable in the axial direction. The upper yoke 30 and the lower yoke 31 are displaceably supported by the supports 23 and 24, and are swingable about the supports 23 and 24.

Thus, in conjunction with the rotation of the input shaft 11 whereby the engine torque is transmitted, the input disks 13 and 16 rotate, and the rotation of the input disks 13 and 16 is transmitted to the integral-type output disk 17 through the power rollers. In addition, as the tilting rotation angle of the power roller is changed, the abutment angle of the power roller with respect to the input disk 13 or 16 and the integral-type output disk 17 is changed, with the result that a desired transmission ratio is imparted continuously.

As shown in FIG. 2A, the integral-type output disk 17 has the first and second traction surfaces 17a and 17b on its both side surfaces, and has first and second flat surface portions 17c and 17d on both radially outward side surfaces of these traction surfaces 17a and 17b. It should be noted that the first traction surface 17a is formed on the side surface where the second flat surface portion 17d is formed, i.e., on the other side surface opposite to one side surface where the first flat surface portion 17c is formed. The second traction surface 17b is formed on the one side surface where the first flat surface portion 17c is formed. That is, the integral-type output disk 17 includes a first side surface having a first traction surface 17a and a second flat surface portion 17d and a second side surface having a second traction surface 17b and a first flat surface portion 17c. In addition, an surface having concave and convex portions 32, which is constituted by a gear for transmitting a driving force and sensor grooves or the like for detecting the state of rotation, is provided on an outer peripheral surface 17e of the integral-type output disk 17. An inner peripheral surface 17f is formed into a smooth cylindrical surface.

Here, a description will be given of a method of manufacturing the above-described integral-type output disk 17. It should be noted that the following steps are performed by using known techniques and performed before the machining steps of the present invention: the step of forming a rough shape of the disk by forging, the step of performing cutting work with respect to necessary portions such as both traction surfaces, the inner peripheral surfaces, and the like into shapes with machining allowances imparted thereto, and the step of hardening by heat treatment and the like, so that a description thereof will be omitted.

Figure 3:
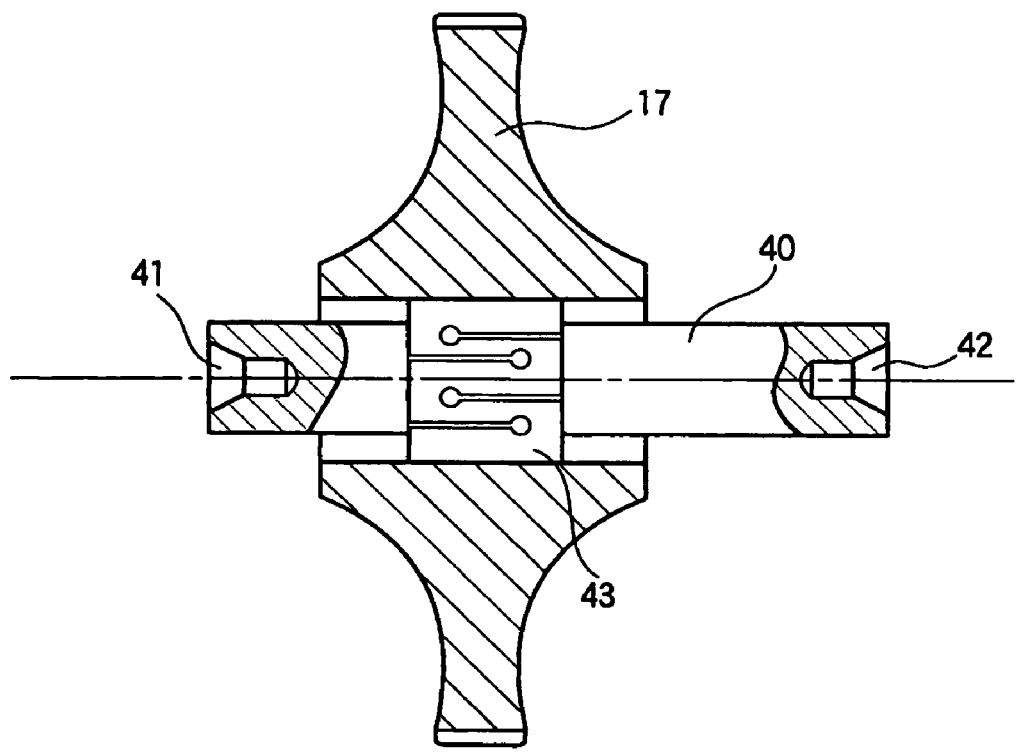
FIG. 3 is a schematic cross-sectional view illustrating a step of fixing the output disk shown in FIGS. 2A and 2B to a core bar.

First, as shown in FIG. 3, a core bar 40 is fixed to the annular integral-type output disk 17. The core bar 40 has at its both end portions center holes 41 and 42 which serve as reference portions for rotation at the time of machining, and has at its intermediate portion a collet chuck 43 for gripping the inner peripheral surface of the output disk 17.

Figures 4A, 4B:
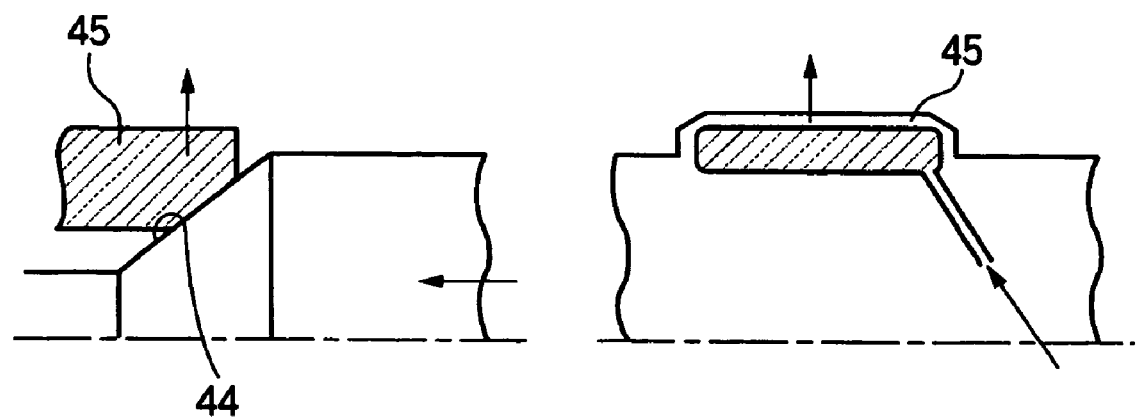
FIGS. 4A and 4B are schematic diagrams illustrating a method of chucking in the fixing step shown in FIG. 3.

It should be noted that the collet chuck 43 may be arranged to expand a collet 45 by making use of a tapered surface 44 (see FIG. 4A), or may be arranged to expand the collet 45 by making use of fluid pressure such as oil pressure (see FIG. 4B).

Next, the integral-type output disk 17 and the core bar 40 are set in a finishing machine, and by rotatively driving the output disk 17, the first traction surface 17a is machined by means of a grinding wheel 46 for machining a traction surface.

Figure 5A:
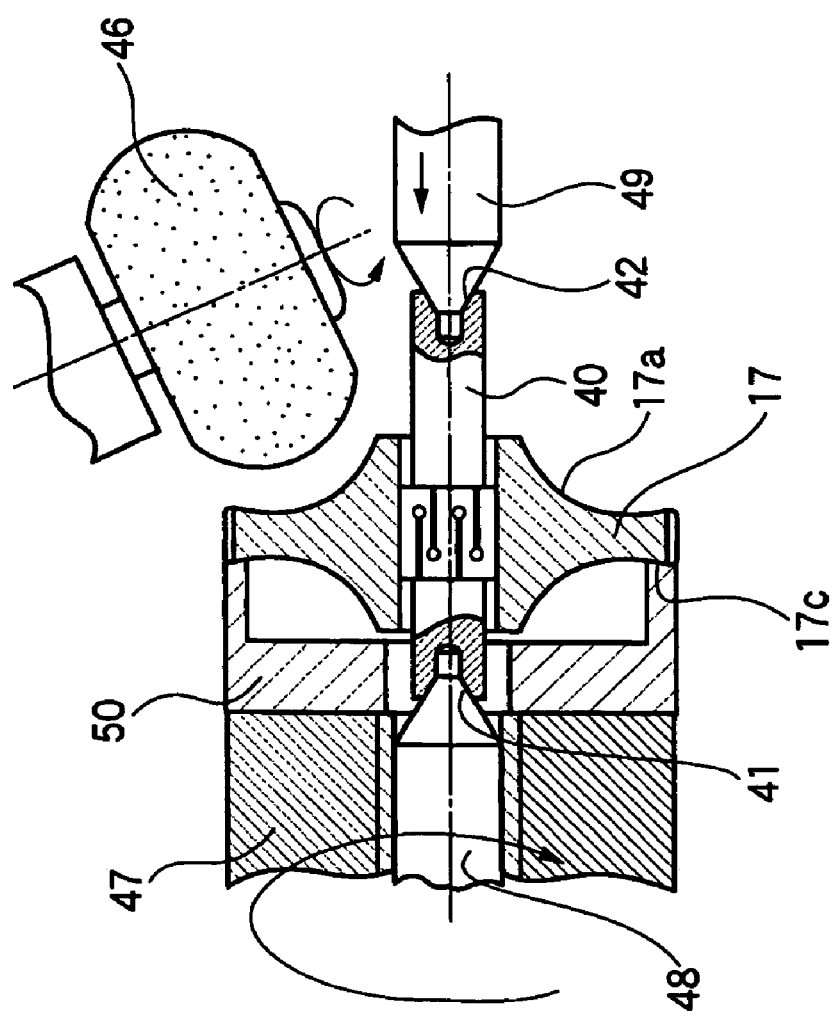
FIGS. 5A and 5B are schematic cross-sectional views illustrating a step of machining one traction surface of the output disk shown in FIGS. 2A and 2B.
Figure 5B:
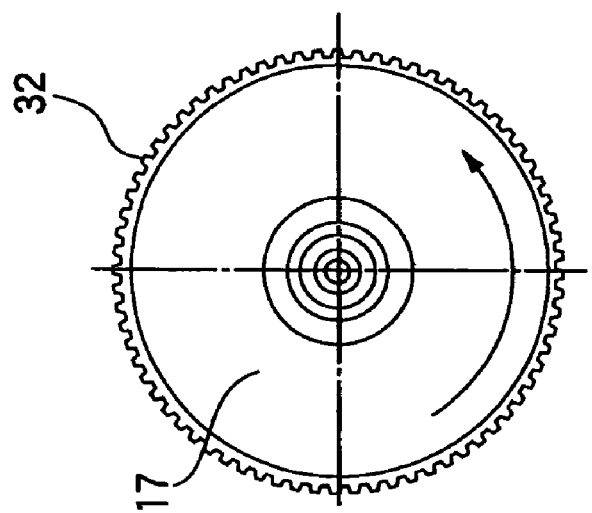

Specifically, as shown in FIG. 5A, the center holes 41 and 42 provided in both end portions of the core bar 40 are clamped by a head center 48, which is a first center within a main spindle 47 of the finishing machine, and a tail center 49, which is a second center disposed in such a manner as to oppose it. The tail center 49 is axially movable by means of an unillustrated cylinder which is driven by oil pressure or air pressure, or by a ball screw or the like. In addition, the head center 48 has such a mechanism that when the tail center 49 has pushed in the core bar 40, the head center 48 is axially movable by following the axial movement of the tail center 49 while maintaining a fixed gripping force.

In addition, a backing plate 50, which serves as a reference for axial abutment for positioning the output disk 17 in the axial direction, is mounted on the main spindle 47 of the finishing machine in contact with the first or second flat surface portion 17c or 17d of the output disk 17. The backing plate 50 has been magnetized by an electromagnetic force or the like, and imparts a power to the output disk 17 by rotating together with the main spindle 47. Accordingly, as the integral-type output disk 17 fixed to the core bar 40 is clamped the head center 48 and the tail center 49, the first flat surface portion 17c is abutted against the backing plate 50.

Subsequently, in the state in which the first flat surface portion 17c is abutted against the backing plate 50, if the output disk 17 is rotatively driven and the first traction surface 17a is machined, the first traction surface 17a and the center holes 41 and 42 of the core bar 40 are set in a coaxial relationship.

Figure 6:
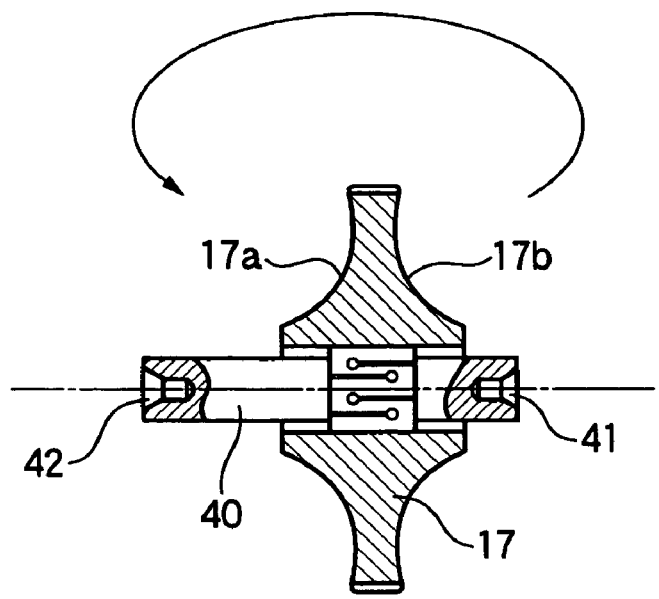
FIG. 6 is a schematic cross-sectional view illustrating a step of inverting the output disk shown in FIGS. 2A and 2B.
Figure 7:
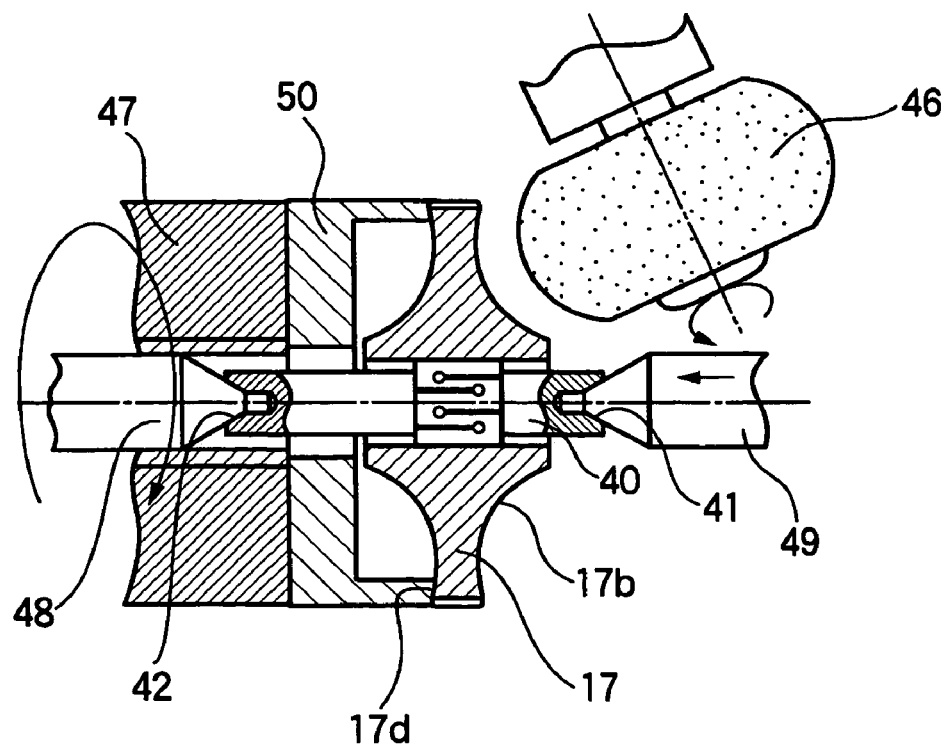
FIG. 7 is a schematic cross-sectional view illustrating a step of machining the other traction surface of the output disk shown in FIGS. 2A and 2B.

Next, this core bar 40 is inverted without removing the output disk 17 from the core bar 40 (see FIG. 6). In a state in which the second flat surface portion 17d formed on the other side surface of the output disk 17 is abutted against the backing plate 50, the output disk 17 is rotatively driven, and the second traction surface 17b of the output disk 17 is machined by the grinding wheel 46 (see FIG. 7). As a result, the second traction surface 17b and the center holes 41 and 42 of the core bar 40 are also set in a coaxial relationship.

Accordingly, since the first and second traction surfaces 17a and 17b are machined without removing the core bar 40 from the output disk 17, satisfactory accuracy in the concentricity of the first and second traction surfaces 17a and 17b can be imparted.

Further, in a case where accuracy in concentricity is required for the first and second traction surfaces 17a and 17b and the inner peripheral surface 17f, the machining of the inner peripheral surface 17f is performed, as shown in FIGS. 8A and 8B. First, a pair of shoes 52, which are supporting members provided on a supporting base 51 fixed on the finishing machine, are abutted against either one of the first and second traction surfaces 17a and 17b (the first traction surface 17a in FIGS. 8A and 8B) so as to position the integral-type output disk 17 in the radial direction. Further, a rotatively drivable backing plate (reference for axial abutment) 53 is abutted against either one of the first and second flat surface portions 17c and 17d (first flat surface portion 17c in FIGS. 18A and 18B) so as to position and the output disk 17 in the axial direction. In this state, as the backing plate 53 is rotatively driven by the main spindle 47, the output disk 17 is rotated while the first traction surface 17a is being slid on the supporting base 51, to thereby machine the inner peripheral surface 17f by an inner peripheral surface grinding wheel 54. Accordingly, since the first traction surface 17a on the supporting base 51 serves as a reference for rotation, satisfactory accuracy in the concentricity of the first traction surface 17a and the inner peripheral surface 17f can be imparted.

Figure 9:
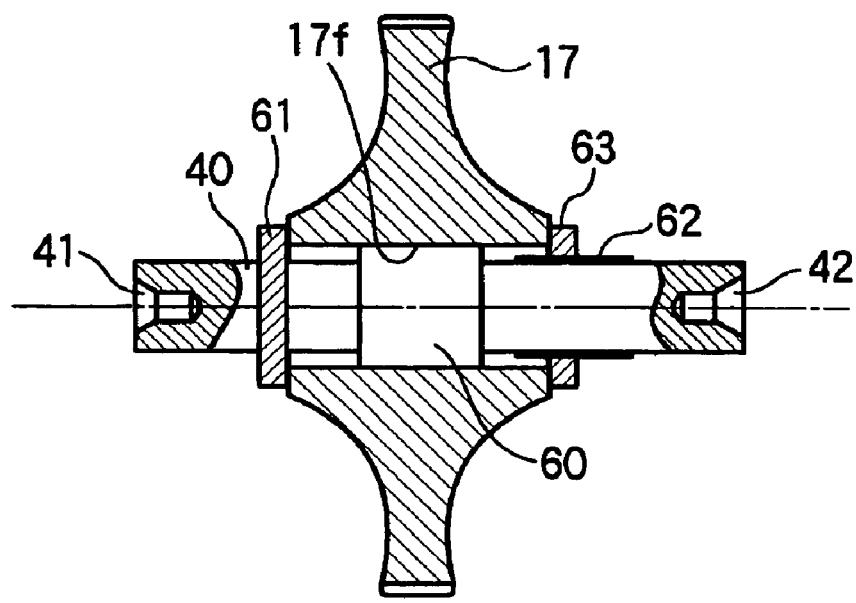
FIG. 9 is a schematic cross-sectional view illustrating another method of fixing the output disk shown in FIGS. 2A and 2B to the core bar.

Although in this embodiment the output disk 17 is fixed to the core bar 40 by making use of the collet chuck 43, the output disk 17 may be fixed to the core bar 40, as shown in FIG. 9. Namely, while the inner peripheral surface 17f is being guided by a centering locating sleeve 60, one end of the output disk 17 is abutted against a collar 61. Further, an abutment nut 63 is threadedly fitted with an external thread 62 formed on the core bar 40 to thereby grip the other end of the output disk 17.

Figure 10:
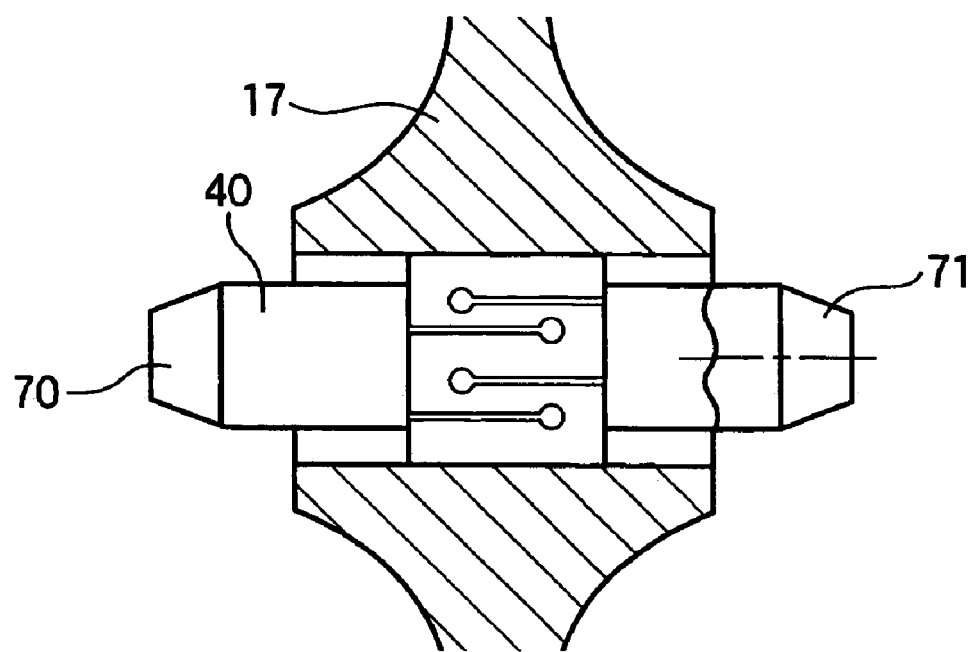
FIG. 10 is a schematic cross-sectional view illustrating a modification of centers at both end portions of the core bar.
Figure 11:
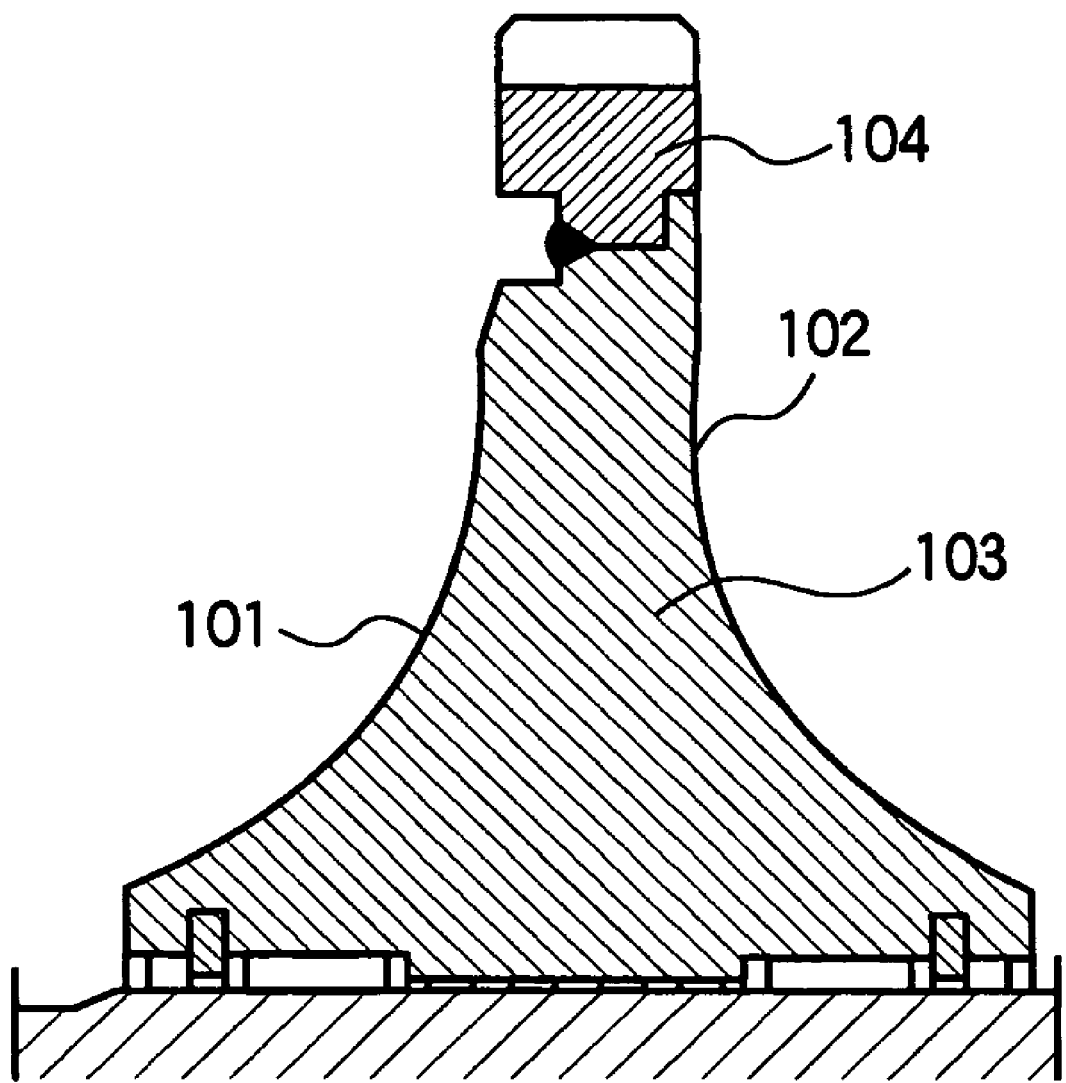
FIG. 11 is a cross-sectional view of essential portions illustrating a conventional integral-type output disk.
Figure 12:
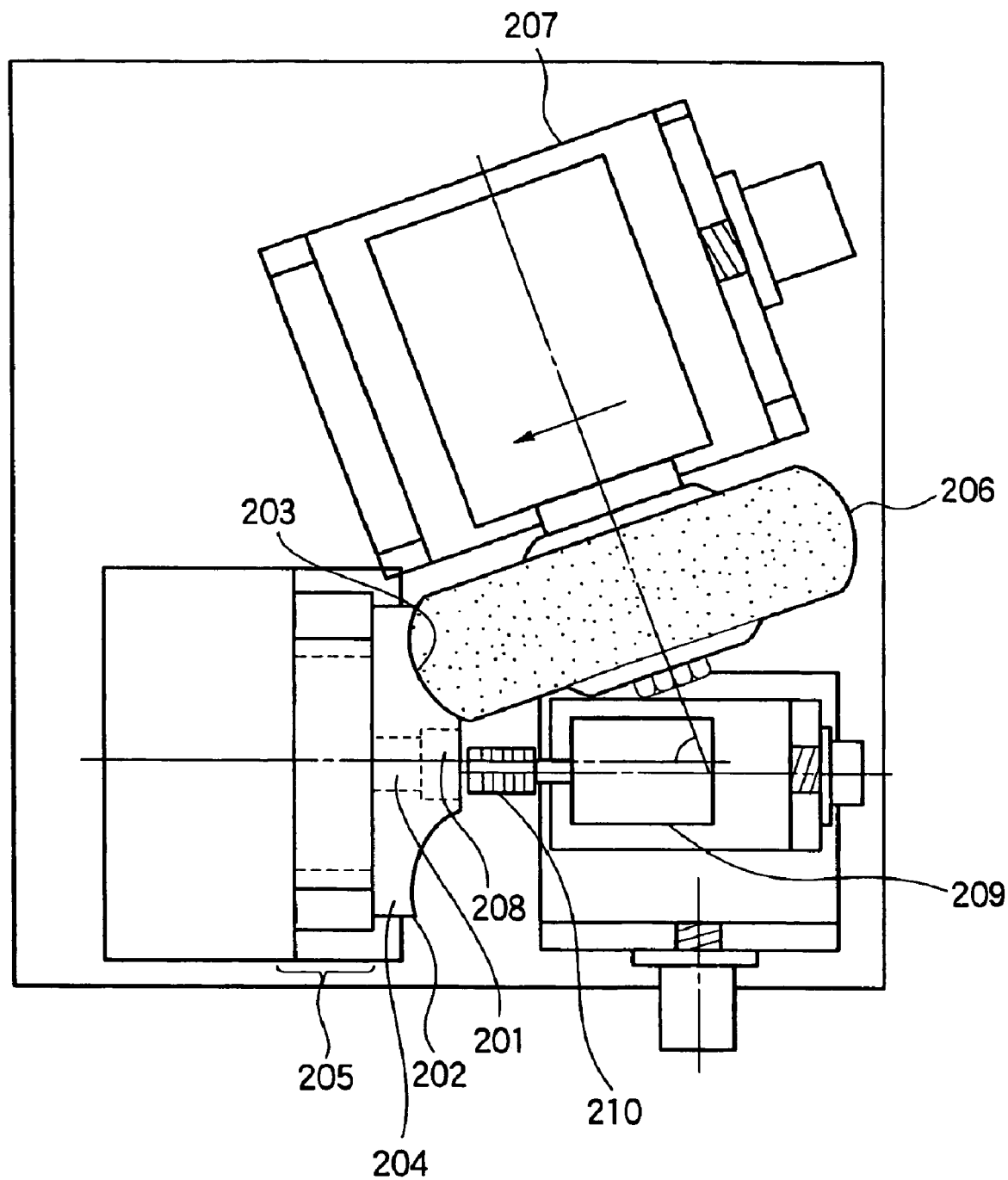
FIG. 12 is a schematic diagram illustrating a step of grinding a traction surface of the conventional disk.
Figure 13:
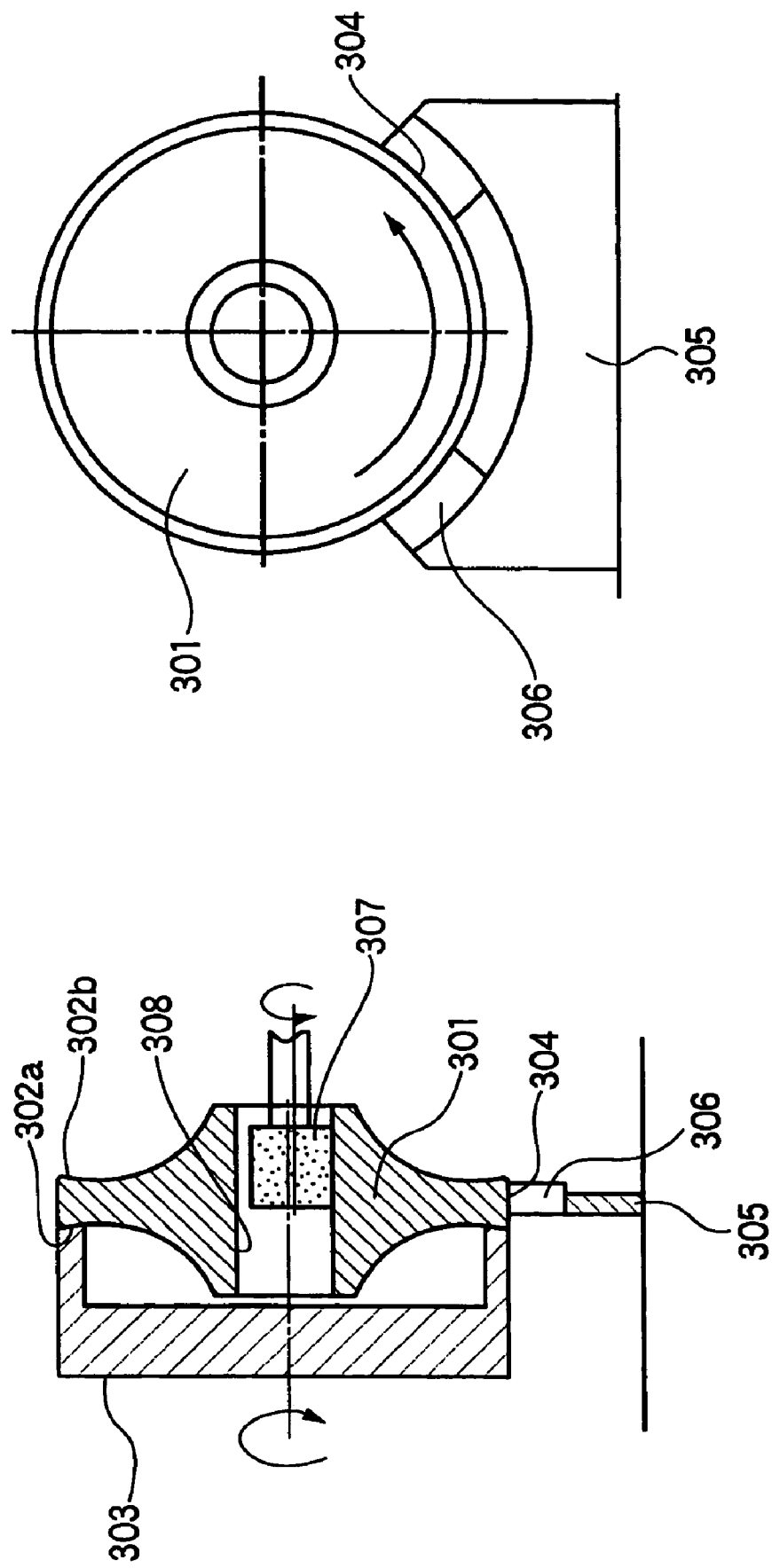
FIGS. 13A and 13B are schematic diagrams illustrating a step of grinding the inner peripheral surface of the conventional integral-type output disk.
Figure 14:
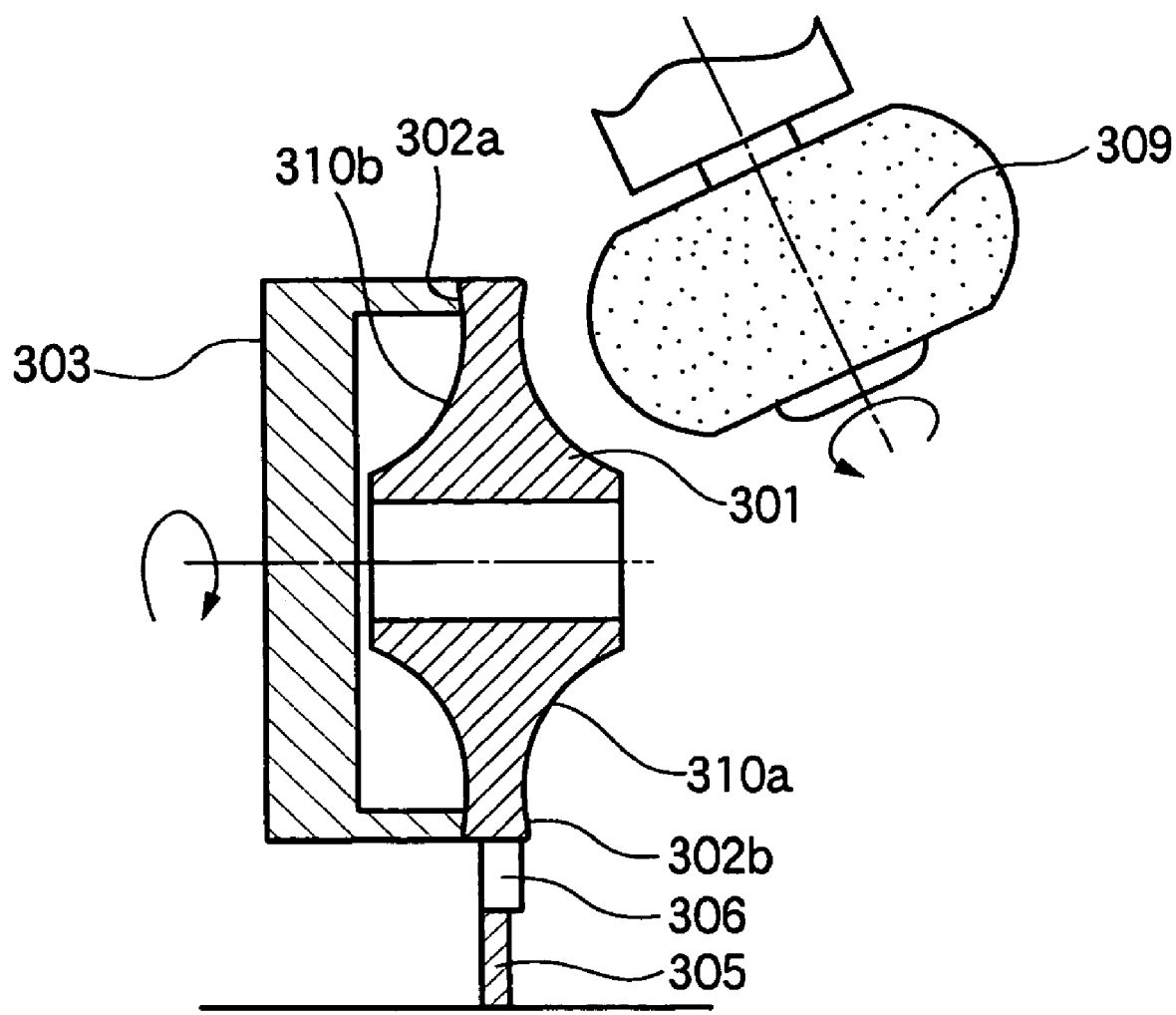
FIG. 14 is a schematic diagram illustrating the step of grinding the traction surface of the conventional integral-type output disk.
Figure 15:
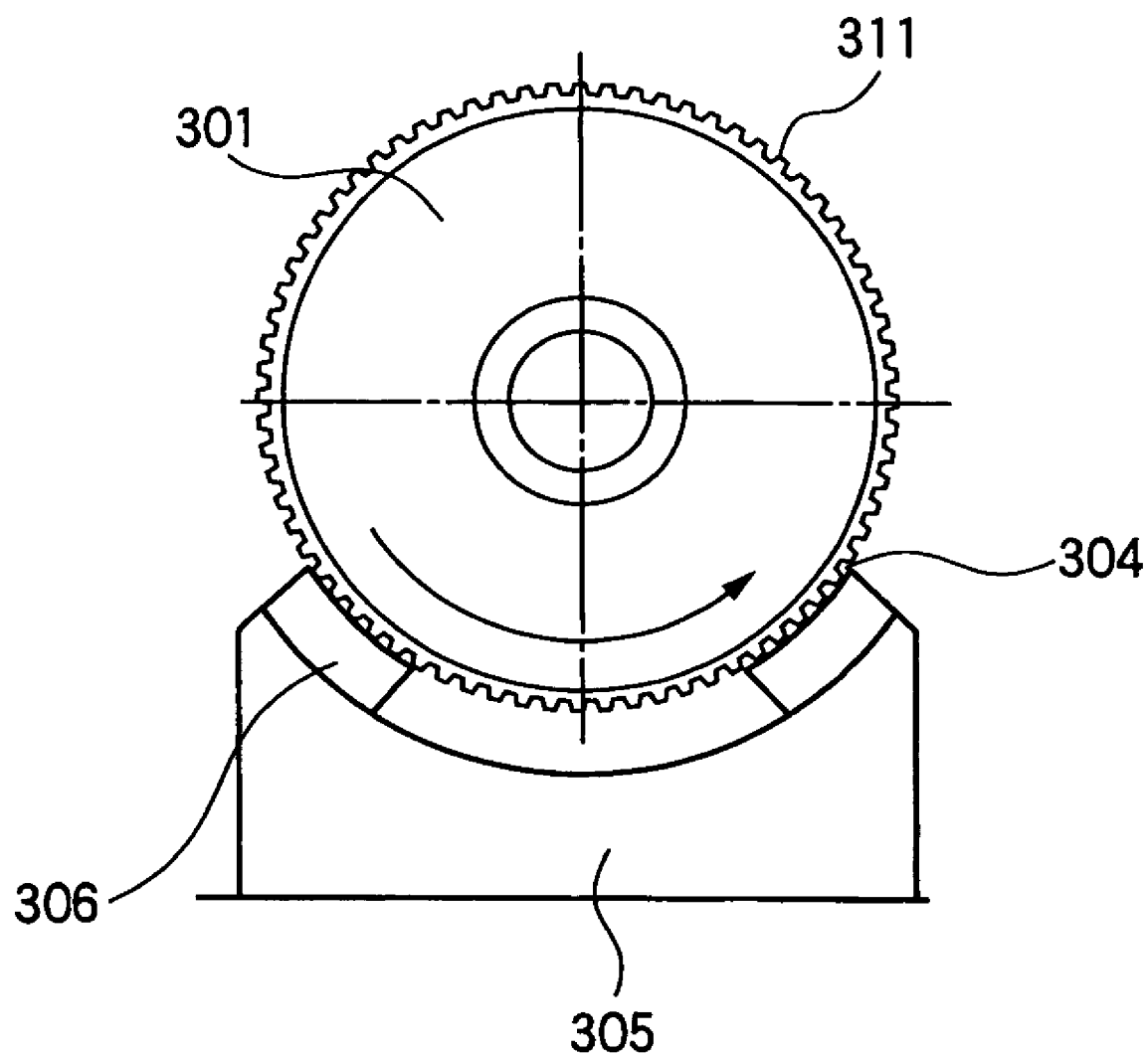
FIG. 15 is a side elevational view illustrating a state in which the integral-type output disk having an surface having concave and convex portions on its radially outer peripheral surface is supported by a supporting base.

In addition, as shown in FIG. 10, instead of the center holes 41 and 42, male centers 70 and 71 may be used as rotation reference portions of the core bar 40, and may be adapted to clamp the core bar 40 by being inserted in the head center 48 and the tail center 49.

As described above, in the method of machining the integral-type output disk 17 of the toroidal-type continuously variable transmission 10 according to this embodiment, after the annular integral-type output disk 17 is fixed to the core bar 40, the pair of center holes 41 and 42 are clamped by the head center 48 on the main spindle 47 side of the finishing machine and the tail center 49 opposing the head center 48. Then, in the state in which the first flat surface portion 17c formed on one side surface of the output disk 17 is abutted against the backing plate 50, the output disk 17 is rotatively driven and the first traction surface 17a formed on the other side surface of the output disk 17 is machined. Further, the output disk 17 is inverted in the state of being fixed to the core bar 40, and the pair of center holes 41 and 42 are clamped by the head center 48 and the tail center 49. Then, in the state in which the second flat surface portion 17d formed on the other side surface of the output disk 17 is abutted against the backing plate 50, the output disk 17 is rotatively driven, and the second traction surface 17b formed on the one side surface of the output disk 17 is machined. Accordingly, since the inner peripheral surface 17f of the output disk 17 is adapted to be fixed to the core bar 40, the both traction surfaces 17a and 17b can be machined with the shape of the outer peripheral surface kept arbitrary. In addition, since the both traction surfaces 17a and 17b are machined by using the core bar 40 as the reference for rotation during machining without needing to unchuck in the course of the operation, the accuracy in the concentricity of the both traction surfaces 17a and 17b becomes high.

In addition, in the method of machining the integral-type output disk 17 of the toroidal-type continuously variable transmission 10 according to this embodiment, the traction surface 17a formed on the one side surface of the annular output disk 17 is abutted against the shoes 52 fixed to the supporting base 51, and the output disk 17 is positioned in the radial direction by the supporting base 51. Meanwhile, the flat surface portion 17c formed on the other side surface of the output disk 17 is abutted against the backing plate 53 which is fixed to the main spindle 47 of the finishing machine and is rotatively driven, and the output disk 17 is positioned in the axial direction by the backing plate 53. Then, in the state in which the output disk 17 is positioned in the radial and axial directions, the inner peripheral surface 17f of the output disk 17 is machined. Accordingly, the traction surface 17a is positioned in the radial direction on the fixed supporting base 51, and the output disk 17 is rotated while the traction surface 17a is being slid on the supporting base 51. Thus, the machining of the inner peripheral surface 17f is effected while using the traction surface 17a as the reference for rotation. Therefore, the accuracy in the concentricity of the traction surface 17a and the inner peripheral surface 17f becomes high. Furthermore, no restriction is imposed on the shape of the outer peripheral surfaces in machining.

It should be noted that the present invention is not limited to the above-described embodiment, and modifications, improvements, and the like are possible, as required.

The toroidal-type continuously variable transmission is applicable not only to a toroidal-type continuously variable transmission of the double cavity type, but also to a toroidal-type continuously variable transmission of the single cavity type. In addition, although in this embodiment variator components are used for a half-toroidal type continuously variable transmission, the variator components may be used for a full-toroidal type continuously variable transmission as well.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A method of machining a disk for a toroidal-type continuously variable transmission,
the disk including:
a first side surface having a first traction surface and a second flat surface portion; and
a second side surface having a second traction surface and a first flat surface portion, the method of machining the disk comprising:
fixing an annular disk to a core bar having a pair of reference portions for rotation at both ends thereof;
clamping the pair of reference portions by a first center on a main spindle side of a finishing machine and a second center opposing the first center;

abutting a first flat surface portion against a reference for axial abutment attached to the main spindle;
machining a first traction surface while rotating the disk;
unclamping the core bar;
inverting the disk with the disk fixed to the core bar;
clamping the pair of reference portions by the first center and the second center;
abutting a second flat surface portion against the reference for axial abutment; and
machining a second traction surface while rotating the disk.

2. The method of machining a disk for a toroidal-type continuously variable transmission according to claim 1, wherein a convex and a concave portion are formed on an outer peripheral surface of the disk.

3. The method of machining a disk for a toroidal-type continuously variable transmission according to claim 1, wherein a collet chuck is used as the core bar.

4. The method of machining a disk for a toroidal-type continuously variable transmission according to claim 1, wherein the reference portion for rotation is a center hole.

5. The method of machining a disk for a toroidal-type continuously variable transmission according to claim 1, wherein the reference portion for rotation is a male center.

6. The method of machining a disk for a toroidal-type continuously variable transmission according to claim 1, wherein a backing plate is used as the reference for axial abutment.

7. The method of machining a disk for a toroidal-type continuously variable transmission according to claim 1, wherein the abutment between the first flat surface portion and the reference for axial abutment is kept by electromagnetic force.

8. The method of machining a disk for a toroidal-type continuously variable transmission according to claim 1, wherein the disk is integrally formed.

9. The method of machining a disk for a toroidal-type continuously variable transmission according to claim 1, further comprising:
abutting the first traction surface against a supporting member fixed to a supporting base so as to define a radial position of the disk by the supporting base;
abutting the first flat surface portion against the reference for axial abutment so as to define an axial position of the disk by the reference for axial abutment; and
machining an inner peripheral surface of the disk in a state in which the position of disk is defined in the radial direction and the axial direction.

10. A method of machining a disk for a toroidal-type continuously variable transmission, comprising:
abutting a traction surface formed on one side surface of an annular disk against a supporting member fixed to a supporting base so as to define a radial position of the disk by the supporting base;
abutting a flat surface portion formed on another side surface of the disk against a reference for axial abutment which is fixed to a main spindle of a finishing machine and is rotatively driven so as to define an axial position of the disk by the reference for axial abutment; and
machining an inner peripheral surface of the disk in a state in which the position of disk is defined in the radial direction and the axial direction.

11. The method of machining a disk for a toroidal-type continuously variable transmission according to claim 10, wherein a convex and a concave portion are formed on an outer peripheral surface of the disk.

* * * * *